Oct. 28, 1924.

E. BEATTY 1,513,529

HELICOPTER

Filed Nov. 5, 1923    3 Sheets-Sheet 3

E. Beatty
Inventor,

By CAsnowleo.
Attorneys.

Patented Oct. 28, 1924.

1,513,529

UNITED STATES PATENT OFFICE.

EDWARD BEATTY, OF BROOKLYN, NEW YORK.

HELICOPTER.

Application filed November 5, 1923. Serial No. 672,900.

*To all whom it may concern:*

Be it known that I, EDWARD BEATTY, a citizen of the United States, residing at Brooklyn, in the county of Kings and State of New York, have invented a new and useful Helicopter, of which the following is a specification.

This invention relates to helicopters, one of the objects being to provide a heavier-than-air machine combining the features of an ordinary soaring plane and a helicopter so that a portion of the mechanism can be utilized for lifting the machine while another portion can be utilized for sustaining the machine while in forward flight.

A further object is to provide a helicopter utilizing rotatable superposed planes designed to exert a downward displacement of air sufficient to elevate the machine, simple and efficient means being utilized for varying the pitch of the planes during their rotation.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Fig. 8 is an enlarged section through the connection between one of the shifting rods and the head or disk thereon.

Figure 1:
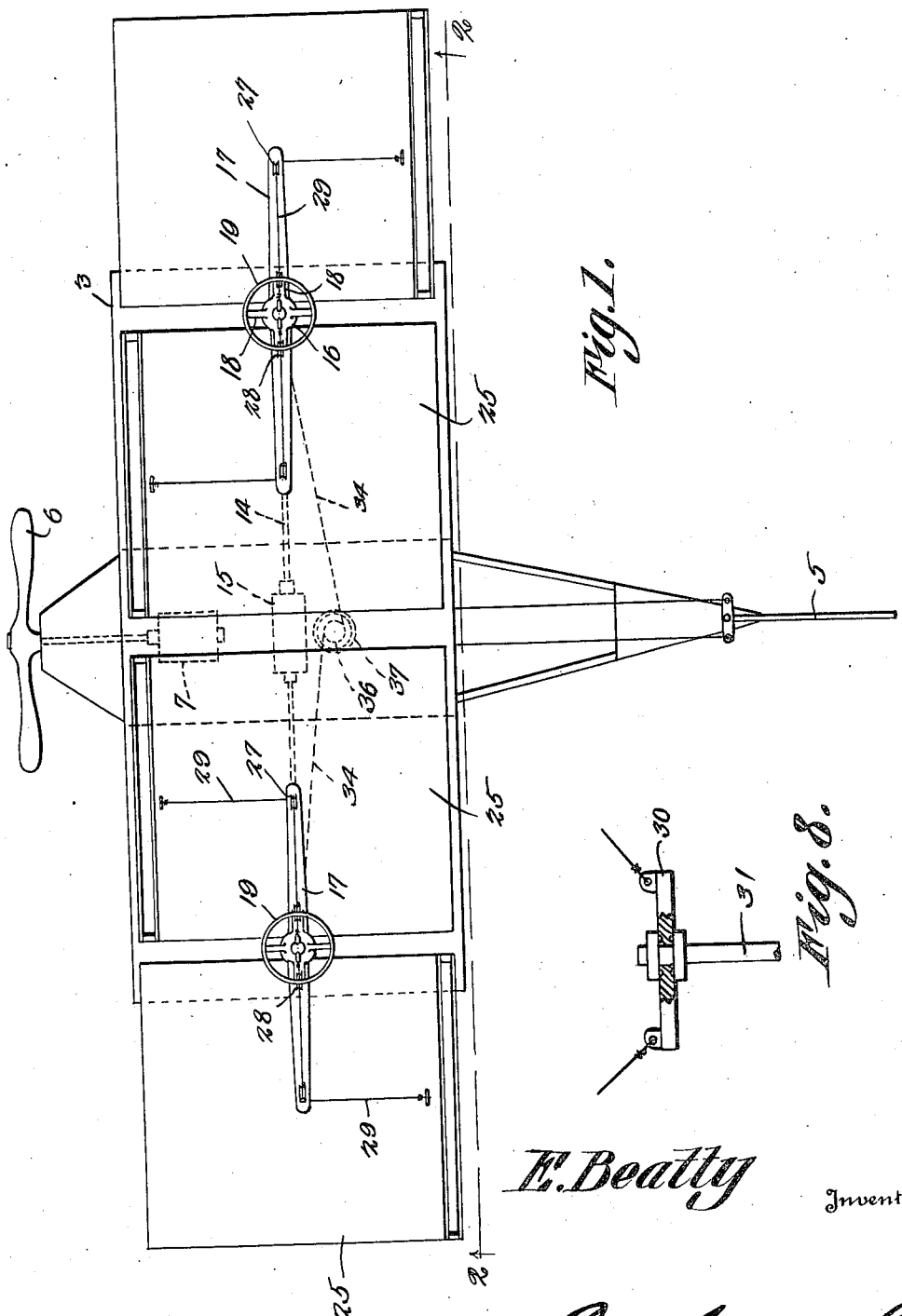
Figure 1 is a plan view of the machine.
Figure 2:
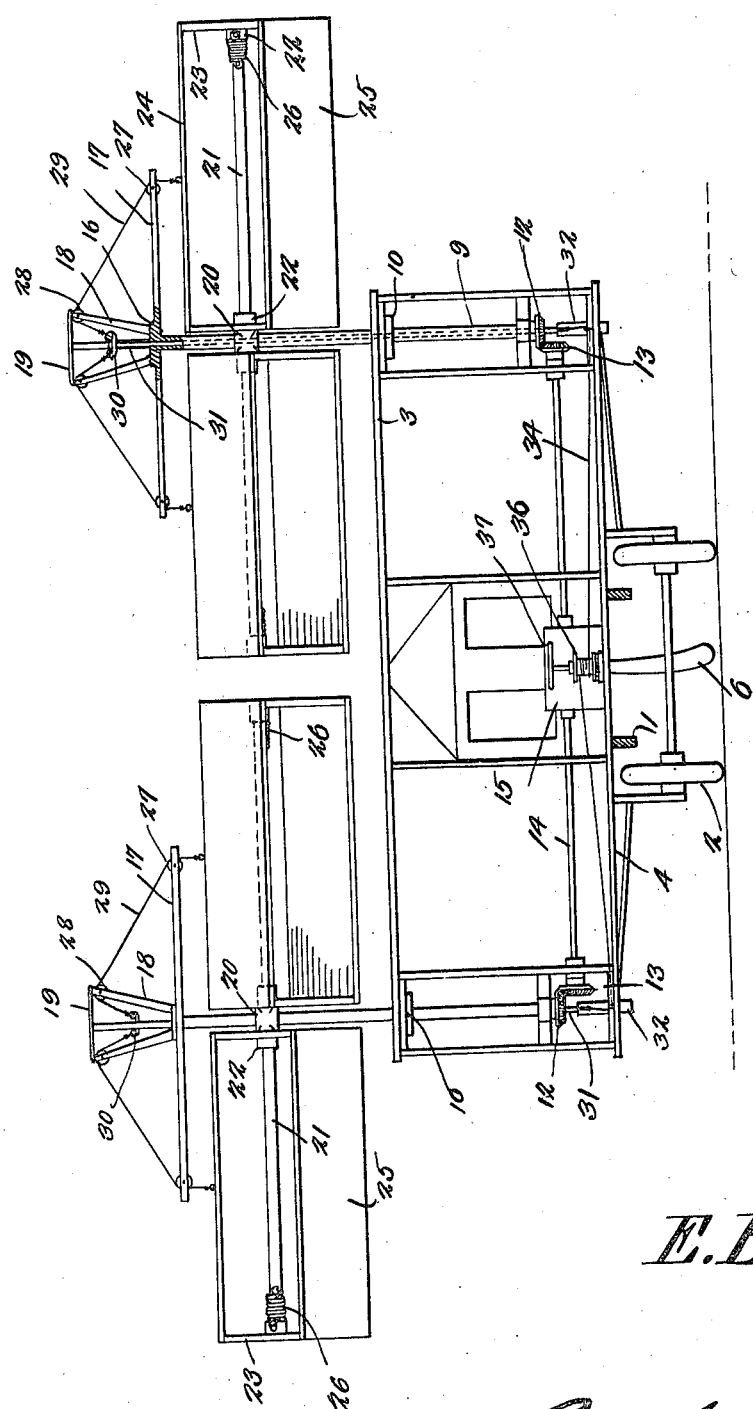
Fig. 2 is a section on line 2—2, Fig. 1, a portion of the helicopter mechanism being broken away.
Figure 3:
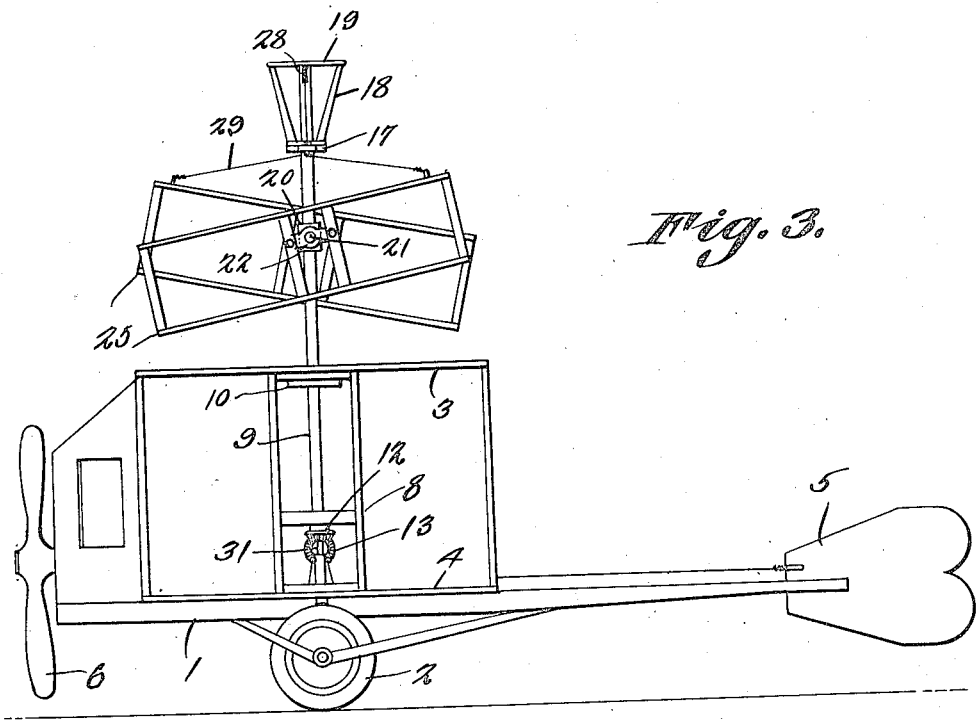
Fig. 3 is a side elevation.
Figure 4:
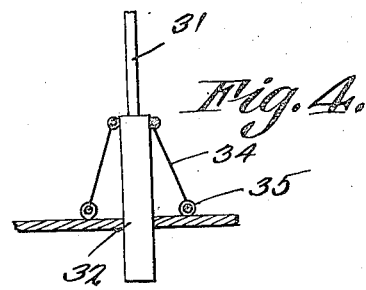
Fig. 4 is an elevation of a portion of the helicopter mechanism.
Figure 6:
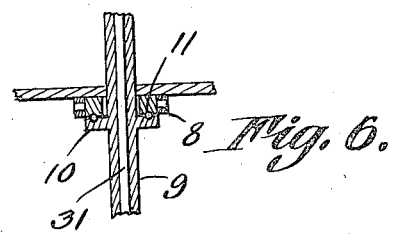
Fig. 6 is a section through one of the helicopter bearings.
Figure 7:
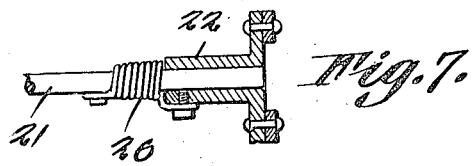
Fig. 7 is a section through one of the end bearings of the helicopter plane and showing its controlling spring.
Figure 5:
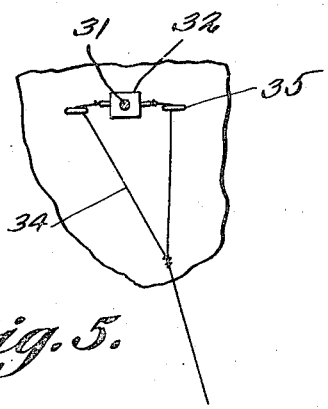
Fig. 5 is a plan view of the structure shown in Fig. 4.

Referring to the figures by characters of reference 1 designates the frame of an aeroplane having suitable running gear 2, there being mounted on this frame superposed sustaining planes 3 and 4 and a tail plane or rudder 5 all of which can be controlled by the usual or any preferred mechanism forming no part of the present invention. A propeller 6 is located in front of the machine and is adapted to be driven by a motor indicated generally at 7. Upstanding frames 8 are provided between the planes 3 and 4 adjacent their ends and in these frames are journaled tubular shafts 9 each of which is provided with a collar 10 adapted to thrust upwardly against a ball bearing 11 carried by the upper portion of the frame 8 as shown in Fig. 6. A gear 12 is secured to the lower portion of each tubular shaft and meshes with a gear 13 secured to one end of a shaft 14 driven by a motor 15. This shaft is extended in opposite directions from the motor and is geared to both of the shafts 9 so that said shafts will be operated at the same speed under all conditions.

Secured to or formed with the upper end of each of the shafts 9 is a hub 16 having oppositely extending arms 17 and upwardly diverging arms 18, these latter arms being connected at their upper ends by a ring 19 whereby they are properly reinforced.

Secured to or formed with each shaft 9 between the hub 16 and the top plane 3 is a collar 20 in which are securely fastened the inner ends of pivot shafts 21 extending radially from the shaft 9 and disposed in alinement. On each of these shafts 21 are mounted bearings 22 secured to end frames 23 and these end frames constitute means for connecting but spacing superposed helicopter planes 24 and 25. Obviously two of these planes are provided for each shaft 21. A spring 26 is mounted on each shaft 21 and is connected at one end to the shaft and at its other end to one of the bearings 22. These springs are constantly under tension and tend to force the front or advancing edges of the planes 24 and 25 downwardly.

Guide pulleys 27 are mounted on the arms 17 and additional guide pulleys 28 are supported by certain of the arms 18. Cables 29 are mounted on these pulleys, one end of each cable being attached to the advancing edge of one of the planes 24. The other ends of the cables are connected to a head 30 mounted to rotate on an operating rod 31 slidable within and extending downwardly through the shaft 9. The lower end of this rod is angular as shown at 32 and is slidably mounted within an angular opening 33 in the aeroplane structure. Thus rod 31 is held against rotation although free to slide longitudinally. Operating cords 34 are secured to the sides of the angular portion 32 of the rod and are extended downwardly through guides 35. These cords are then extended to a windlass or reel 36 adapted to be rotated by means of a hand wheel 37 and to be held by suitable pawl and ratchet mechanism or the like, not shown, in any position to which it might be moved. The cords 34 connected to the rods 31 of both helicopter units are connected to this windlass, so that when it is rotated both rods will be simultaneously actuated.

It will be obvious that when the rods are pulled downwardly by pulling on the cords 34 the cables 29 will pull upwardly on the front or advancing edges of the plane 24, thereby placing springs 26 under increased tension and providing the angle of incidence necessary to effect the desired lift.

To helicopter units are provided and as they are rotated at a high speed the planes 24 and 25 will of course act to exert a lifting force sufficient to raise the machine from the ground. During the operation of the helicopter the rods 31 can be shifted to tilt the helicopter planes upwardly or downwardly as desired. As before pointed out the propeller 6 can be used for driving the entire machine forward at which time the planes 3 and 4 will serve as sustaining means. It is to be understood of course that as the rods 31 cannot rotate the heads or the heads or disks 30 will revolve thereon during the rotation of the tubular shaft 9 and the helicopter planes mounted thereon.

What is claimed is:—

1. The combination with an aeroplane structure, of upstanding tubular shafts journaled in the side portions thereof, oppositely extending pivot shafts rotatable with each of the upstanding shafts, a pair of superposed helicopter planes pivotally mounted on each of the pivot shafts, resilient means for holding the helicopter planes normally tilted downwardly at their advancing edges, operating means slidable within the tubular shafts, and means for transmitting motion from the operating means to the helicopter planes to adjust said planes angularly against the action of their springs.

2. The combination with an aeroplane structure, of upstanding tubular shafts journaled in the side portions thereof, oppositely extending pairs of superposed helicopter planes rotatable with each shaft and tiltable about a radial axis, yielding means for holding said planes normally tilted downwardly in either direction of rotation, and means slidable within the shafts for simultaneously lifting the advancing edges of the helicopter planes against the action of said yielding means.

3. The combination with an aeroplane structure, of upstanding tubular shafts journaled therein, means for simultaneously rotating the shafts, oppositely extending pairs of superposed helicopter planes rotatable with each shaft, and tiltable about axes radiating from the shaft, springs for holding said planes normally tilted downwardly at their advancing edges, non-rotatable rods within the shafts, means for simultaneously sliding the rods, and means operated by the rods for lifting the advancing edges of the planes against the action of said springs during the rotation of the shafts.

4. In a machine of the class described, the combination with spaced upstanding tubular shafts and means for simultaneously rotating the same, of oppositely extending pivot shafts rotatable with each of the upstanding shafts, a pair of superposed helicopter planes tiltably mounted on each pivot shaft, yielding means for holding each plane normally extended downwardly toward one edge, non-rotatable operating rods slidable within the upstanding shafts, a structure rotatable with each upstanding shaft and overhanging the planes, connections between the rods and the normally depressed edges of the planes for elevating said edges against the action of the yielding means, and guides on said structure for the connections.

5. In a helicopter the combination with a rotatable tubular shaft and diverging arms at the upper end of and rotatable with the shaft, of oppositely extending pivot shafts rotatable with the tubular shaft, superposed helicopter planes tiltably mounted on each pivot shaft, yielding means for holding said planes normally tilted in one direction, a non-rotatable rod slidable within the tubular shaft, guides upon the arms, and flexible connections between the rod and the upper planes of the pairs, said connections being mounted on the guides.

In testimony that I claim the foregoing as my own, I have hereto affixed my signature in the presence of two witnesses.

EDWARD BEATTY.

Witnesses:
VINCENT SCHULTZ,
OLIVER McCULLADY.